United States Patent [19]

Eguchi et al.

[11] 4,191,121

[45] Mar. 4, 1980

[54] BUTTONHOLE STITCH CONTROL SYSTEM FOR A SEWING MACHINE

[75] Inventors: Yasukata Eguchi, Kunitachi; Hachiro Makabe, Fussa, both of Japan

[73] Assignee: Janome Sewing Machine Co. Ltd., Tokyo, Japan

[21] Appl. No.: 799,322

[22] Filed: May 23, 1977

[30] Foreign Application Priority Data

May 27, 1976 [JP] Japan .................. 51-60672

[51] Int. Cl.² .................... D05B 3/02; D05B 3/06
[52] U.S. Cl. ........................ 112/158 B; 112/158 E
[58] Field of Search ........... 112/158 B, 158 E, 158 R, 112/121.11, 121.12, 275, 277

[56] References Cited

U.S. PATENT DOCUMENTS

| | | | |
|---|---|---|---|
| 3,074,632 | 1/1963 | Braun et al. ............... | 112/121.11 X |
| 3,596,618 | 8/1971 | Goldbach et al. .......... | 112/158 B |
| 3,841,246 | 10/1974 | Casner et al. ............. | 112/77 |
| 3,855,956 | 12/1974 | Wurst ......................... | 112/158 E |
| 4,019,449 | 4/1977 | Hauf ........................... | 112/158 B |

FOREIGN PATENT DOCUMENTS

2702488 7/1977 Fed. Rep. of Germany ....... 112/158 E

Primary Examiner—Peter Nerbun
Attorney, Agent, or Firm—Michael J. Striker

[57] ABSTRACT

The invention relates to a buttonhole stitch control system for a sewing machine, which previously determines the size of a button to be employed and operates the sewing machine to automatically stitch a buttonhole corresponding to the size of the employed button. According to the sewing machine of this invention, the sewing machine is previously set by the machine operator to memorize the size of a button to be employed so that the sewing machine may automatically stitch all processes of the buttonhole, namely the first bar-tack stitches, the left side line-tack stitches, the second bar-tack stitches and the right side line-tack stitches of the buttonhole, only after the first needle position has been determined by the operator.

16 Claims, 4 Drawing Figures

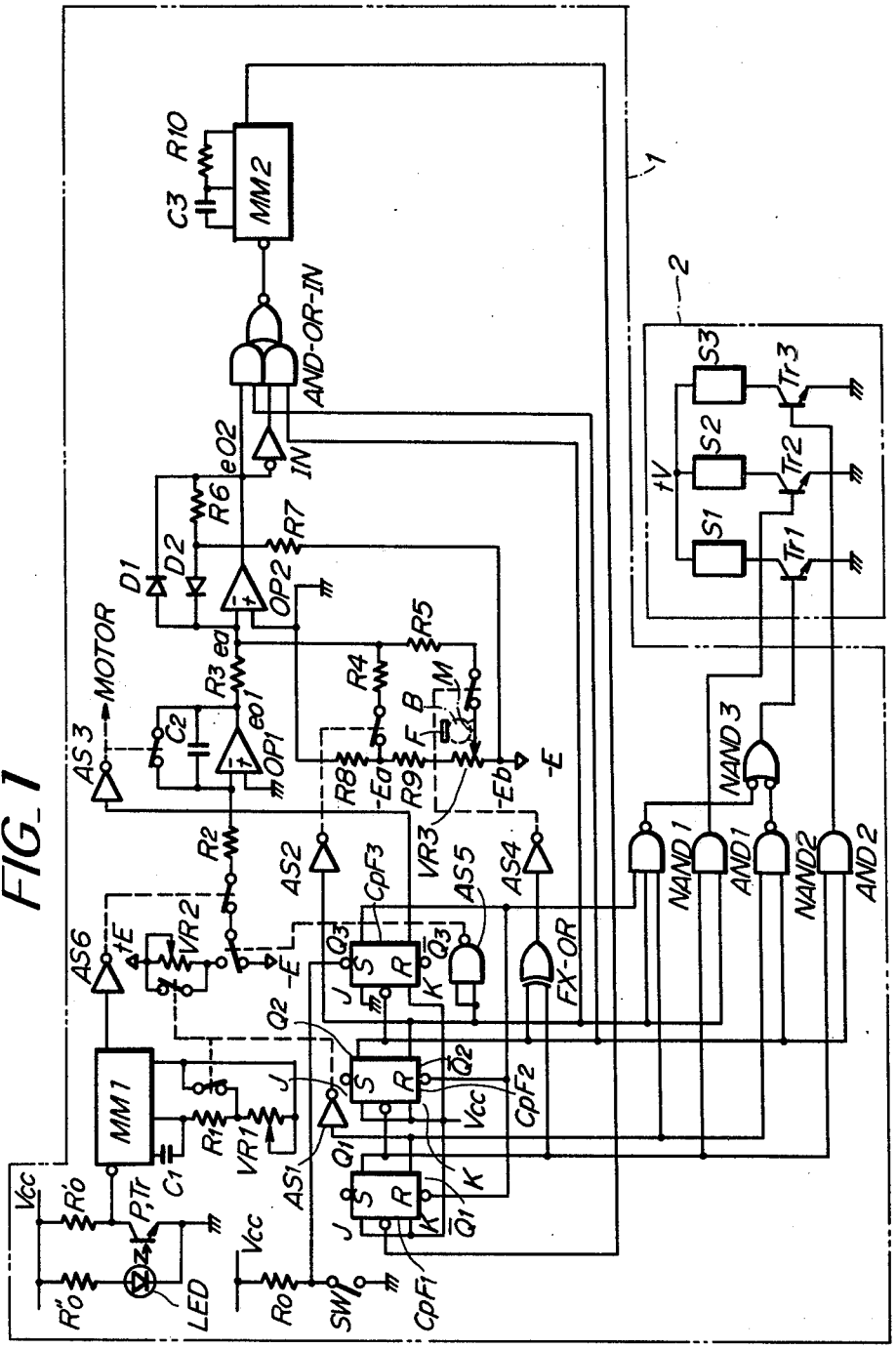
FIG_1

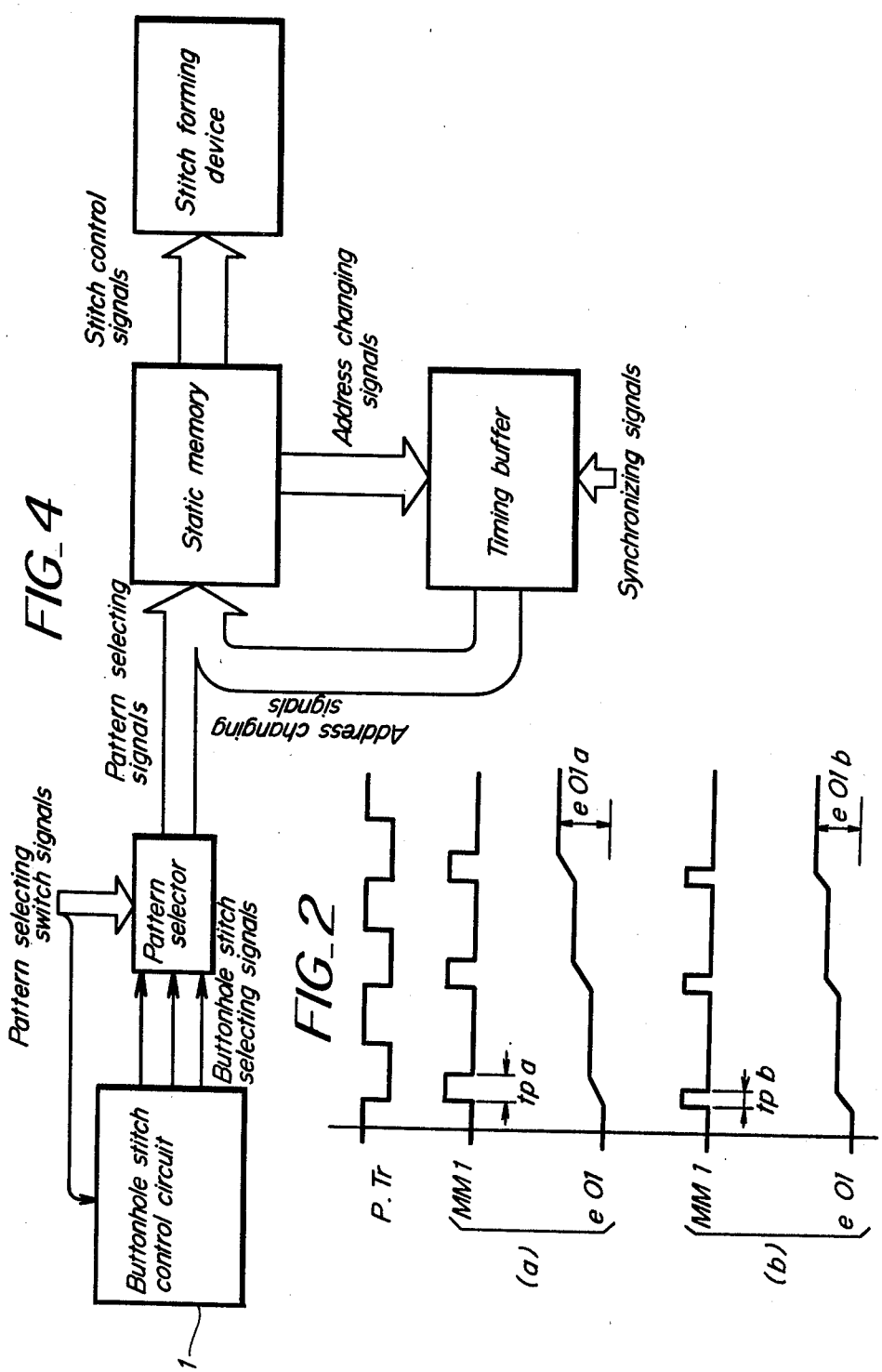

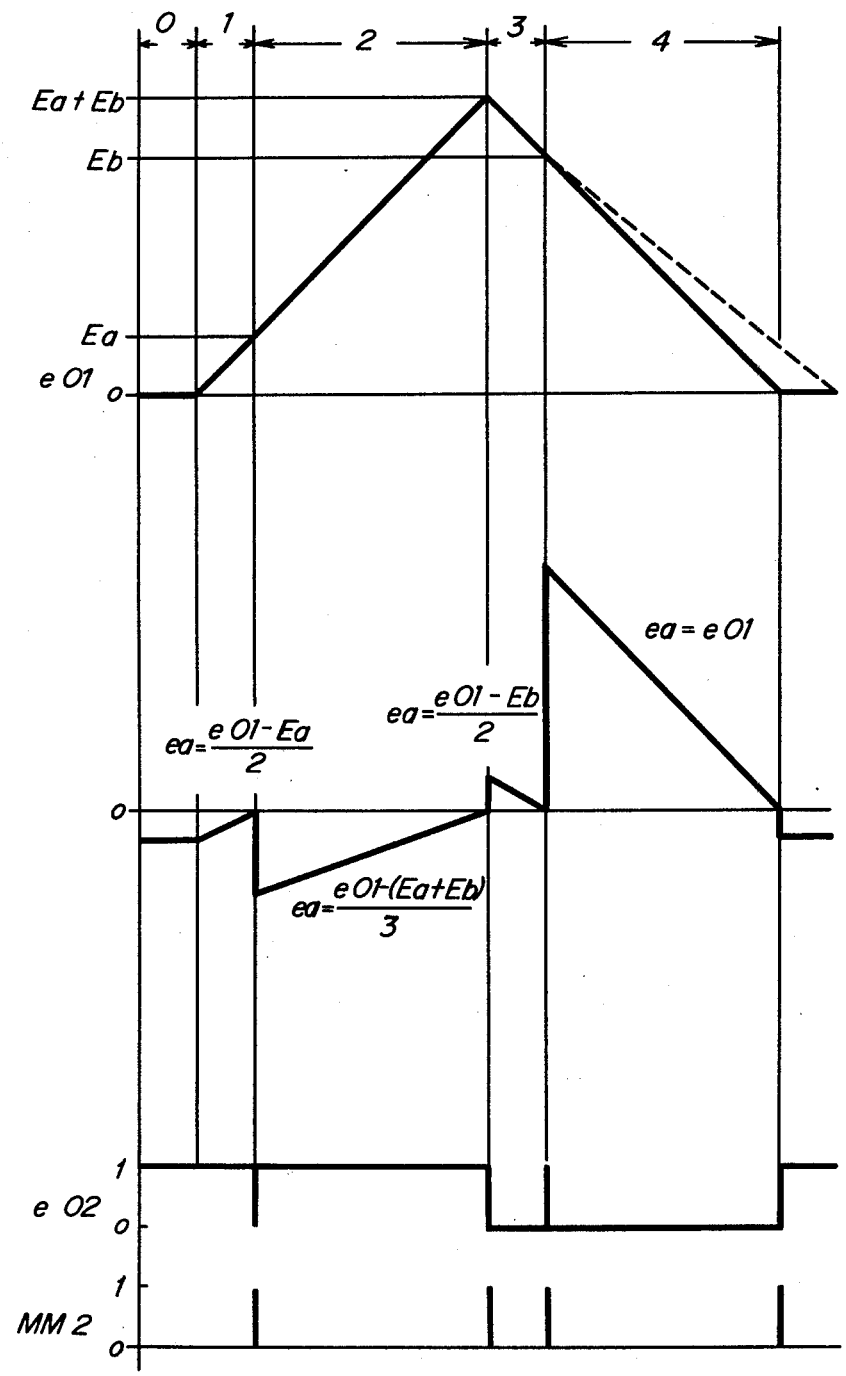

BUTTONHOLE STITCH CONTROL SYSTEM FOR A SEWING MACHINE

BACKGROUND OF THE INVENTION

Generally the buttonhole stitched by sewing machines is composed of first bar-tack stitches, left side line-tack stitches, second bar-tack stitches and right side line-tack stitches. Heretofore, it has been necessary for the machine operator to manually adjust the buttonhole stitching device of the sewing machine each time at the termination of stitches of the four stitch processes of the buttonhole. At least it has been necessary for the machine operator to manually adjust the buttonhole stitching device two times for stitching the first half and the second half of the buttonhole. Further the machine operator must measure the size of a button before the buttonhole is stitched, so as to make the formation of a buttonhole in accordance with the button to be employed. Depending upon the manual adjustment of the sewing machine, it may happen that the stitched buttonhole is large or small for the size of the button. In any event, according to the prior art, it has been difficult or troublesome to stitch a buttonhole with a sewing machine. Especially manual operation of the sewing machine during stitching a buttonhole has produced various disadvantages for the machine operator.

The present invention has been devised to eliminate such disadvantages of the prior art. Namely it is the fundamental object of the invention to provide a system in a sewing machine for easily setting the size of a buttonhole in accordance to a button to be employed.

It is a second object of the invention to provide a sewing machine for automatically stitching all stitch processes of a buttonhole.

It is another object of the invention to provide a system for electrically controlling the buttonhole stitching operation of a sewing machine, and especially adapted to be used in an electronic sewing machine.

Many other features and advantages of the invention will be apparent from the following description of the invention, in which, FIG. 1 shows a control circuit of the invention for controlling the buttonhole stitching operation of a sewing machine, FIG. 2 shows the operation of an operation amplifier in accordance with the invention, FIG. 3 shows the operation of another operation amplifier in accordance with the invention, and FIG. 4 shows a block diagram in which the buttonhole stitch control circuit of the invention is used in an electronic sewing machine.

DETAILED DESCRIPTION OF THE INVENTION

In the circuit shown in FIG. 1, reference numeral (1) is a control part of the buttonhole stitching system, and numeral (2) is a solenoid part for making effective the cams which control each of the buttonhole stitching conditions. $(F_1)(F_2)(F_3)$ are J-K type flip-flop circuits for changing over to the four successive stitching operations of a buttonhole consisting of one side bar-tack stitches, the left side line-tack stitches, the other side bar-tack stitches and the right side line-tack stitches. $(F_3)$ has a set terminal (S) connected to a manually operated switch (SW), and is set by a falling signal when the switch (SW) is closed. (Vcc) is a DC power source for the control circuit. $(R_0)$ as well as $(R'_0)$ and $(R''_0)$ are ordinary power control resistors. Among the flip-flop circuits $(F_1)(F_2)(F_3)$, only $(F_3)$ has a terminal (J) which is at 0 potential. The other flip-flop circuits $(F_1)(F_2)$ have terminals (J)(K) connected to the power source (Vcc).

The flip-flop circuits $(F_1)(F_2)(F_3)$ have true side output terminals $(Q_1)(Q_2)(Q_3)$ and complement side output terminals $(\overline{Q_1})(\overline{Q_2})(\overline{Q_3})$ respectively. $(\overline{Q_1})$ is connected to an analog switch $(AS_1)$, $(\overline{Q_2})$ is connected to analog switches $(AS_2)$ and $(AS_5)$, $(\overline{Q_3})$ is connected to an analog switch $(AS_3)$, and $(Q_1)$ and $(Q_2)$ are connected to an analog switch $(AS_4)$ via an exclusive OR circuit (EX, OR). The respective analog switches [and also a switch $(AS_6)$] become conductive when they receive a logic value 1 as illustrated. In this condition of the circuit, $(AS_3)$ deenergizes the machine motor (MOTOR), and $(AS_5)$ makes effective the $(-E)$ side of the power source.

$(\overline{Q_1})(\overline{Q_2})(Q_3)$ are connected to a NAND circuit $(NAND_1)$, $(\overline{Q_1})(Q_2)$ are connected to AND circuit $(AND_1)$, $(Q_1)(Q_2)$ are connected to NAND circuit $(NAND_2)$, $(Q_1)(Q_2)$ are connected to AND circuit $(AND_2)$, $(Q_3)$ is connected of the reset terminals (R) of the flip-flop circuits $(F_1)(F_2)$, the trigger terminal $(C_p)$ of the flip-flop circuit $(F_1)$ is connected to the output of a monostable multivibrator $(NM_2)$, the trigger terminal $(C_p)$ of the flip-flop circuit $(F_2)$ is connected to the true side output terminal $(Q_1)$ of the flip-flop circuit $(F_1)$, and the trigger terminal $(C_p)$ of the flip-flop circuit $(F_3)$ is connected to the true side output terminal $(Q_2)$ of the flip-flop circuit $(F_2)$.

The outputs of the NAND circuits $(NAND_1)$-$(NAND_2)$ are connected through NAND circuit $(NAND_3)$ to the base of a transitor $(Tr_1)$, so as to operate a solenoid $(S_1)$ which is connected to the collector of the transistor for the purpose of making effective a cam (not shown) for bar tack stitches of a buttonhole. The output of the AND circuit $(AND_1)$ is connected to the base of a transistor $(Tr_2)$ so as to operate a solenoid $(S_2)$ which is connected to the collector of the transistor for the purpose of making effective a cam (not shown) for the left side line-tack stitches of a buttonhole, and the output of the AND circuit $(AND_2)$ is connected to the base of a transistor $(Tr_3)$ so as to operate a solenoid $(S_3)$ which is connected to the collector of the transistor for the purpose of making effective a cam (not shown) for the right side line-tack stitches of the buttonhole.

$(+V)$ is a DC power source for operating the solenoids $(S_1)(S_2)(S_3)$. $(MM_1)$ is a monostable multivibrator which receives collector signals produced by a photo-transistor (P.Tr) each time the photo-transistor receives light from a light emitting diode (LED). Thus the monostable multivibrator $(MM_1)$ generates pulses of a width determined by a capacitor $(C_1)$, a resistor $(R_1)$ and a variable resistor $(VR_1)$, to make the analog switch $(AS_6)$ conductive. Therefore, the voltage at the $(-E)$ side of the power source is applied to the input $(-)$ of an operation amplifier $(OP_1)$, to render effective the input side of the integrator which counts the signals from the monostable multivibrator $(MM_1)$. As illustrated, the non-inverting input terminal $(+)$ of the operation amplifier is at 0 potential. The variable resistor $(VR_1)$ is operated in association with a cloth feed speed adjusting dial of the sewing machine (not shown), and adjusts the pulse width of the mono-stable multivibrator $(MM_1)$.

($VR_2$) is a variable resistor whch is operated in association with a dial (not shown) for adjusting the number of the right side line-tack stitches of a buttonhole, and together with a resistor ($R_2$), sets the charge and discharge time constant of a capacitor ($C_2$). ($e0_1$) denotes the potential at the output side of the operation amplifier ($OP_1$). ($OP_2$) is another operation-amplifier, the non-inverting input terminal (+) of which is at 0 potential. The operation-amplifier ($OP_2$) is a main element of a comparator which compares the potential ($e0_1$) with the reference voltage ($-Ea$) or/and the reference voltage ($-Eb$) and receives the resultant potential (ea) at its inverting input terminal (−), and then generates the potential ($e0_2$), so as to properly divide the stitching process of the buttonhole pattern.

($VR_3$) is a button size sensing variable resistor, the wiper (M) of which is set relative to one end of a button, the other end of the button being supported by a fixed plate (F) of the sewing machine. The wiper (M) varies the voltage ($-Eb$) of the variable resistor ($VR_3$) to determine the number of the left and right side line-tack stitches of a buttonhole. The wiper may be manually set relative to a graduated scale corresponding to the size of a button. The variable resistor ($VR_3$) and resistors ($R_8$)($R_9$) receives the voltage ($-E$) and determines the values of the reference comparison voltages ($-(Ea)$($-Eb$). Resistors ($R_3$)($R_4$)($R_5$) and ($R_8$)($R_9$) ($VR_3$) have the relations $R_3=R_4=R_5$ and ($R_8$, $R_9$, $VR_3$)$<<$($R_3$, $R_4$, $R_5$).

Resistors ($R_6$), ($R_7$) and diodes ($D_1$), ($D_2$) have been provided to make a TTL level of the output potential ($e0_2$) of the operation amplifier ($OP_2$), and are so arranged that the output potential ($e0_2$) has a logic value 1 when the input potential (ea) is negative, and that the output potential ($e0_2$) has a logic value 0 when the input potential (ea) is positive. The output of the operation amplifier ($OP_2$) is matched with the true side output ($Q_2$) of the flip-flop circuit ($F_2$) on one hand and connected to the input side of AND-OR-IN circuit (AND-OR-IN). The output of the operation amplifier ($OP_2$) is also matched on the other hand with the compliment side output ($\overline{Q_2}$) of the flip-flop circuit ($F_2$) and connected via an inverter (IN) to the input side of the AND-OR-IN circuit (AND-OR-IN). The output of the AND-OR-IN circuit (AND-OR-IN) is connected to the input of the monostable multivibrator (MM2), the output of which is connected to the gate terminal (Cp) of the flip-flop circuit ($F_1$). A capacitor ($C_3$) and a resistor ($R_{10}$) have been provided to set the time during which the monostable multivibrator (MM2) is operated.

With the foregoing structure of constituent parts, when the manually operated switch (SW) is closed, one side bar-tack stitches of a buttonhole are stitched as a first step. Namely when the switch (SW) is closed, the flip-flop circuit ($F_3$) is set and the logic value 0 at the compliment side output ($\overline{Q_3}$) makes the analog switch (AS3) inconductive to render the operation amplifier effective. Simultaneously the machine motor (MOTOR) is driven, and the logic value 1 is at the true side output ($Q_3$) releases the reset of the flip-flop circuits ($F_1$)($F_2$).

The compliment side outputs ($\overline{Q_1}$)($\overline{Q_2}$) respectively of the flip-flop circuits ($F_1$)($F_2$) continue to have a logic value 1, and the analog switches (AS1)(AS2) continue to be conductive. The analog switch (AS5) maintains the ($-E$) side of the reference voltage which is applied to the inverting input terminal (−) of the operation amplifier ($OP_1$), and the analog switch (AS4) continues to be inconductive. The NAND circuit (NAND1) receives a logic value 1 from the respective outputs of the flip-flop circuits ($F_1$)($F_2$)($F_3$), and renders the transistor (Tr1) conductive via the NAND circuit (NAND3). Therefore, the solenoid (S1) is energized to make effective the cam for bar-tack stitches of the buttonhole.

When the machine motor (MOTOR) is driven, the first bar-tack stitches of a buttonhole are stitched. In the meantime, per rotation of the main shaft of the sewing machine (at each predetermined position of the needle bar), the photo-transistor (P.Tr) receives light from the light emitting diode (LED), and is operated. With the falling signals of the transistor (P.Tr), the monostable multivibrator (MM1) generates pulses of the width (tpa) determined by the capacitor ($C_1$) and the resistor ($R_1$) as shown in FIG. 2. While the pulses are generated, the analog switch (AS6) continues to be conductive, and the potential ($e0_1$) at the output of the operation amplifier (OP1) is raised with an inclination determined by the resistor ($R_2$) and the capacitor ($C_2$). Thus the potential (e01) is repeatedly raised each time the analog switch (AS6) becomes conductive.

(a)(b) in FIG. 2 respectively show pulses generated by the monostable multivibrator (MM1), which are of a big width (tpa) and of a small width (tpb), and the potentials (e01a)(e01b) of different levels respectively reached by the potential (e01) with the same number of the pulses.

In FIG. 3 the operation time (tp) of the monostable multivibrator (MM1) is represented by the transverse axis, and the potential (e01) is raised along a straight line in step 1. Since the analog switch (AS2) is conductive as aforementioned, the potential (ea) at the non-inverting input terminal (−) of the operation amplifier (OP2) receives the voltage ($-Ea$) as a reference comparison voltage via resistor ($R_4$). Since the relation $R_3=R_4$ is established, the relation $ea=-Ea/2$ is established when the potential (e01) is 0.

Provided that the TTL changing circuit is not provided, the potential is raised with $ea=(e01-Ea)/2$ during this first phase of operation as shown in FIG. 3, and the potential (ea) becomes 0 when the potential (e01) becomes equal to the voltage (Ea).

Then the output potential (e02) of the operation amplifier (OP2) which has been subjected to the TTL-change becomes 0 as shown in FIG. 3. Therefore, the input to the monostable multivibrator (MM2) via the inverter (IN) and the AND-OR-IN circuit (AND-OR-IN) triggers the monostable multivibrator (MM2) as shown in FIG. 3 to apply a pulse to the trigger terminal (CP) of the flip-flop circuit ($F_1$). Then the flip-flop circuit ($F_1$) is inverted to shift to the second step for stitching the left side line tack stitches of the buttonhole.

Namely, then on the true side outputs of the flip-flop circuits ($F_1$)($F_2$)($F_3$), the output ($Q_1$) has a logic value 1, the ($Q_2$) maintains the logic value 0 because there is no falling signal at the output ($Q_1$), and the output ($Q_3$) maintains 1. Since the logic value is 0 at the compliment side output ($\overline{Q_1}$) of the flip-flop circuit ($F_1$), the solenoid ($S_1$) becomes deenergized, and the first bar-tack stitches of a buttonhole are completed.

The, the logic value 1 at the output ($Q_1$) and the logic value 1 at the output ($\overline{Q_2}$) render the transistor (Tr2) conductive via the AND circuit (AND1), and the solenoid ($S_2$) is energized to make effective a cam for stitching the left side line-tack stitches of the buttonhole. Regarding the flip-flop circuits ($F_1$)($F_2$)(F), the logic value 0 at the output ($\overline{Q_1}$) renders the analog switch (AS1) inconductive, the logic value 1 at the output ($\overline{Q_2}$) renders the analog switch (AS2) conductive, the logic value 0 at the putout ($\overline{Q_3}$) maintains the analog switch (AS3) inconductive, the logic values 1 and 0 at the outputs ($Q_1$)($Q_2$) respectively render the analog switch (AS4) conductive via the exclusive OR circuit (EX, OR), and the logic value 1 at the output ($\overline{Q_2}$) maintains the voltage ($-E$) which is under the influence of analog switch (AS5).

As the main shaft of the sewing machine continues to rotate, the left side line-tack stitches are formed. Simultaneously, per rotation of the main shaft, the monostable multivibrator (MM1) generates pulses of the width determined by the capacitor ($C_1$), the resistor ($R_1$) and the variable resistor (VR1). Thus the potential (e01) is raised in the step 2 in FIG. 3 on the extension of the inclination line in the step 1. In the meantime, with the conduction of the analog switch (AS4), the variable resistor (VR3) and the resistor ($R_5$) are made effective, and the reference voltage to the potential (ea) is shifted from the voltage ($-Ea$) in the step 1 to the voltage ($-Ea-Eb$), and simultaneously the reference voltage ($-Eb$) becomes variable for the detection of the size of a buttonhole by the wiper (M), or for the setting of the wiper (M) relative to the graduation scale according to the size of the buttonhole. Thus the length of the left and right side line-tack stitches of the buttonhole is determined.

With the changeover of the reference voltage from ($-Ea$) to ($-Ea-Eb$), the potential (ea) is as shown in FIG. 3 shifted from the relation ea=(d01$-$Ea)/2=0 to the relation ea=Eb/3, and is raised with ea={e01$-$(Ea+Eb)}/3 during this second step of buttonhole formation. The potential (ea) becomes 0 when the potential (e01) becomes equal to the voltage (Ea+Eb). At this instant, the potential (e02) becomes 0 as shown in FIG. 3, and the monostable multivibrator (MM2) is triggered again and inverts the flip-flop circuit ($F_1$). Thus the second or the other side bar-tack stitches of the buttonhole are stitched in step 3.

Namely, regarding the flip-flop circuits ($F_1$)($F_2$)($F_3$), the output ($Q_1$) becomes 0, the output ($Q_2$) becomes 1 with the falling signal at the output ($Q_1$), and the output ($Q_3$) maintains the logic value 1 because there is no falling signal at the output ($Q_2$). With the logic value 0 at the output ($Q_1$) of the flip-flop circuit ($F_1$), the solenoid ($S_2$) becomes deenergized, and the left side line-tack stitches of the buttonhole are terminated. Then the logic value 1 at the output ($\overline{Q_1}$), together with the logic value 1 at the output ($Q_2$) energizes the solenoid ($S_{1l}$) via the NAND circuits (NAND2)(NAND3) and transistor (Trl) to make the bar-tack stitching cam effective.

The logic value 1 at the output ($Q_1$) renders the analog switch (AS1) conductive, the logic value 0 at the output ($\overline{Q_2}$) renders the analog switch (AS2) inconductive, the logic 0 at the output ($\overline{Q_3}$) maintains the inconductive condition of the analog switch (AS3), the logic value 0 at the output ($Q_1$), together with the logic value 0 at the output ($Q_2$) maintains the conductive condition of the analog switch (AS4) via the exclusive OR circuit (EX, OR), and the logic value 0 at the output ($\overline{Q_2}$) causes the analog switch (AS5) to change over to the (+E) side.

As the main shaft of the sewing machine continues to rotate, the other side or the second bar-tack stitches of the buttonhole are formed. Simultaneously, the monostable multivibrator (MM1) generates, per rotation of the main shaft, pulses of the width determined by the capacitor ($C_1$) and the resistor ($R_1$).

Since the reference voltage applied to the inverting input ($-$) of the operation amplifier (OP$_1$) has been changed over from ($-E$) to ($+E$), the capacitor ($C_2$) discharges, and the potential (e01) falls in an inclination opposite to that in steps 1 and 2 as shown in FIG. 3. In the meantime, since the analog switch (AS2) has become inconductive, the reference voltage to the potential (ea) is shifted from ($-Ea-Eb$) to ($-Eb$), and the potential (ea) is shifted from the relation ea={e0-1<(Ea+Eb)}/3=0 to the valve ea=Ea/2 as shown in FIG. 3. Therefore, the potential (e02) maintains 0 thereafter. As the potential (e01) falls, the potential (ea) falls with the ea=(e01$-$Eb)/2, and becomes ($-$) when the potential (e01) transverses the voltage (Eb). Then the potential (e02) becomes 1, and together with the logic value 1 at the output ($Q_2$) triggers the monostable multivibrator (MM2) via the AND-OR-IN circuit (AND-OR-IN), to invert the flip-flop circuit ($F_1$), and enters step 4 for forming the right side line-tack stitches of the buttonhole.

Namely regarding the flip-flop circuits ($F_1$)($F_2$)($F_3$), the output ($Q_{1l}$) becomes 1, the output ($Q_2$) maintains 1 because there is no falling signal at the output ($Q_1$), and the output ($Q_3$) also maintains 1. Since the output ($Q_1$) is 0, the solenoid becomes deenergized and terminates the second bar-tack stitches of the buttonhole. In the meantime, the logic value 1 at the outputs ($Q_1$)($Q_2$) render the transistor (Tr3) conductive via the AND circuit (AND2) and energize the solenoid ($S_3$) to make effective the cam for the right side line-tack stitches of the buttonhole. The logic value 0 at the output ($Q_1$) renders the analog switch (AS1) inconductive, the logic value 0 at the outputs ($\overline{Q_2}$) ($\overline{Q_3}$) maintain the analog switches (AS2)(AS3) inconductive respectively, the logic value 1 at the outputs ($Q_1$)($Q_2$) render the analog switch (AS4) inconductive via the exclusive OR circuit (EX, OR), and the logic value 0 at the output ($\overline{Q_2}$) maintains the (+E) side which is under the influence of the analog switch (AS5).

As the main shaft of the sewing machine continues to rotate, the right side line-tack stitches of the buttonhole are formed. Simultaneously the monostable multivibrator (MM1) generates, per rotation of the main shaft, pulses of the width determined by the capacitor ($C_1$), resistor ($R_1$) and variable resistor (VR1), and the potential (e01) continuously falls. Since the reference voltage (+E) is applied via the variable resistor (VR2) to the inverting input terminal ($-$) of the operation amplifier (OP1), the falling inclination of the potential (e01) in FIG. 3 is arbitrarily adjusted between the solid line and the dotted line by the adjustment of the discharging time constant of the capacitor which is made by the adjustment of the variable resistor (VR2).

In the meantime, since the analog switch (AS4) has become inconductive, the reference voltage ($-Eb$) is disconnected from the potential (ea), and the potential (ea) is shifted from the valve ea=(e01$-$Eb)/2=0 to the relation ea=Eb, and therefore, the potential (e02) becomes 0 thereafter as shown in FIG. 3.

With the fall of the potential (e01), the potential (ea) falls with an ea=e01. When the potential (e01) transverses 0, the potential (ea) becomes ($-$). At this instant, the potential (e02) becomes 1 again, and together with the logic value 1 at the output ($Q_2$) triggers the monostable multivibrator (MM2) via the AND-OR-IN circuit (AND-OR-IN) to invert the flip-flop circuit ($F_1$), and the system enters step 0. Thus the buttonhole stitches are terminated.

Namely, regarding the flip-flop circuits ($F_1$)($F_2$)($F_3$), the output ($Q_1$) becomes 0, the output ($Q_2$) becomes 0 and the output ($Q_3$) becomes 0 with the falling signal at the output ($Q_2$). Since the output ($Q_1$)($Q_2$)($Q_3$) are all 0, the solenoids ($S_1$) ($S_2$)($S_3$) are all rendered inconductive, and the logic value 1 at the output ($Q_3$) renders the analog switch ($AS_3$) conductive. Thus the machine motor (MOTOR) is stopped and the operation amplifier (OP1) is also rendered inoperative.

FIG. 4 is a block diagram showing an electronic buttonhole stitch control system for a sewing machine without using buttonhole stitch control cams the pattern forming device of the sewing machine consisting of a needle bar and a feed dog and including a control circuit operated by control signals issued from a static memory. The static memory stores stitch control signal and address changing signals which change the addresses of the memory itself through a timing buffer once per rotation of the main shaft of the sewing machine.

According to the embodiment of the invention in FIG. 4, first of all, the machine operator selects a buttonhole pattern by means of one of the pattern selecting switches (not shown). Then the pattern selector receives from the buttonhole stitch control circuit (1) a signal for stitching the first bar-tack stitches of a buttonhole. The bar-tack stitching signal is applied to the input of the static memory. The static memory uses the signal as a first address and designates a first stitch coordinate corresponding to the first address.

The static memory gives the stitch forming device signals for controlling the lateral oscillation of the needle bar and for controlling the operation of the feed dog. Simultaneously the memory gives the timing buffer an address changing signal for selecting a second stitch coordinate. On the other hand, the timing buffer receives a pulse from the pulse generator in synchronism with the rotation of the main shaft of the sewing machine, and writes and holds the address changing signal from the static memory until the timing buffer receives the next synchronizing pulse from the pulse generator. Therefore, the first address changing signal from the static memory becomes the second address of the memory, and the memory gives the control circuit in the stitch forming device a signal corresponding to the second address and designating the second stitch coordinate, and at the same time, the memory gives to the timing buffer the third address changing signal for selecting the third stitch coordinate.

Thus stitch control signals are applied to the static memory one by one per rotation of the main shaft of the sewing machine until a new pattern selecting signal is issued from the buttonhole stitch control circuit. With the last address, the static memory gives the stitch forming device the last signal designating the last stitch coordinate, and simultaneously gives to the timing buffer the address changing signal selecting the first stitch coordinate and, thus repeatedly issues the next stitch control signal to the stitch forming device.

However, after the last stitch of the first bar-tack stitches of a buttonhole has been formed, the buttonhole stitch control circuit (1) issues a signal for selecting the left side line-tack stitches of the buttonhole, and therefore the static memory continues to issue a signal for forming the left side line-tack stitches until the buttonhole stitch control circuit issues a signal for selecting the second bar-tack stitches of the buttonholes. In the same manner, the second bar-tack stitches and the right side line-tack stitches are formed, and one complete cycle of the buttonhole stitches is terminated.

We claim:

1. A buttonhole stitch control system for a sewing machine having a machine frame, a main shaft rotatably supported on the machine frame, and a stitch forming instrument including a needle bar with a needle and a feed dog and operatively connected to the main shaft, comprising a pulse generator (P.Tr, MM1) generating pulse signals in synchronism with the rotation of the main shaft; counter means ($OP_1$) counting the pulse signals generated by the pulse generated by the pulse generator; means ($OP_2$) receiving the signals counted by the counter means and dividing the process of stitching a buttonhole pattern; control means (2) receiving signals from the dividing means to control the stitch forming instrument, and means ($VR_3$) for sensing and electrically memorizing the size of a button employed.

2. A buttonhole stitch control system for a sewing machine having a machine frame, a main shaft rotatably supported on the machine frame, and a stitch forming instrument including a needle bar with a needle and a feed dog operatively connected to the main shaft, comprising a pulse generator (P.Tr, MM1) generating pulse signals in synchronism with rotation of the main shaft; counter means (OP1) counting the pulse signals generated by the pulse generator; means (OP2) receiving the signals counted by the counter means and dividing the process of stitching a buttonhole pattern; control means (2) receiving the signals from the process dividing means to control the stitch forming instrument; switch means (SW) selectively and manually operated to select a buttonhole pattern to be stitched; and means (VR2), (C2) operated in association with the switch means to set, through the counter means, the buttonhole stitch control system to form at least on two processes of the buttonhole stitching cycle respective stitch series whose respective total lengths are adjusted to be equal.

3. A buttonhole stitch control system as claimed in claim 2, wherein the pulse generator includes a monostable multivibrator (MM1), a light emitting diode (LED) and a phototransistor (P.Tr), whereby the monostable multivibrator generates a pulse each time when it receives a signal from the phototransistor which receives a light from the light emitting diode, thereby to render effective the input of the counter means.

4. A buttonhole stitch control system as defined in claim 2, wherein the setting means comprises a variable resistor (VR2) arranged between the pulse generator and the counter means and operated in association with the switch means, and a capacitor (C2) arranged between the variable resistor and the counter means, and having a charging or discharging time constant to be set in accordance to the set position of the variable resistor, thereby to influence the counter means, whereby the buttonhole stitch control system is set to form stitches on the right side line-tack stitching process in accordance to the stitches on the left side line-tack stitching process of the whole buttonhole stitching cycle.

5. A buttonhole stitch control system as defined in claim 2, further comprising a manually operated feed adjusting dial and pulse width changing means, the pulse width changing means comprising a variable resistor (VR1) which is operated in association with the feed adjusting dial, and a capacitor (C1), the charging or discharging time constant of which is set in accordance to the set position of the variable resistor, thereby to influence the pulse generator to change the width of the pulses generated by the pulse generator.

6. A buttonhole stitch control system as defined in claim 5, wherein the counting means comprises an operation amplifier (OP1) which receives the pulses of width variously changed by the pulse width changing means, and a capacitor (C2) having a predetermined charging and discharging time constant to cause the operation amplifier to count up the pulses to change the same to a power voltage.

7. A buttonhole stitch control system as defined in claim 1, further comprising switches (AS2), (AS4) which are operated to determine the respective processes of the whole buttonhole stitching cycle; wherein the counter means (OP1) comprises a first operation amplifier (OP1); and wherein the process dividing means comprises a second operation ampifier (OP2) which receives the output from the first operation amplifier (OP1) and reference comparison voltages (−Ea), (−Eb), (−Ea−Eb) determined by the switches (AS2), (AS4) and the second operation amplifier generates a signal indicating termination of stitches at each division of the buttonhole stitching process, when the output of the first operation amplifier becomes equal to a respective reference comparison voltage.

8. In a sewing machine having a machine frame, a main shaft rotatably supported on the machine frame, and stitch-forming means including a needle bar with a needle and a cloth feeder operatively connected to the main shaft, in combination therewith, a novel buttonholing system capable when actuated of automatically producing all the stitches of a complete buttonhole without operator intervention during the course of buttonhole formation, the buttonholing system comprising
pulse generating means (LED, PTr, MM1) generating pulses in synchronism with rotation of the main shaft;
counter means (OP1, C2) operative for counting the pulses by integrating the pulses with respect to time to form an integral signal (eo1) whose ongoing value indicates how far the buttonholing operation has proceeded;
process-dividing means (OP2) responsive to the integral signal (eo1) and ascertaining therefrom the moments at which the successive phases of buttonhole formation are to be initiated and terminated;
and control means (2 in FIG. 1) responsive to signals from the process-dividing means and controlling the operation of the stitch-forming means during the successive phases of buttonhole formation.

9. In a sewing machine as defined in claim 8, furthermore comprising means (VR1 and/or VR2) operative for adjusting the amount by which the integral signal (eo1) changes per pulse integrated.

10. In a sewing machine as defined in claim 8, furthermore comprising means (VR1) operative for automatically adjusting the amount by which the integral signal (eo1) changes per pulse integrated in dependence upon adjustment of a sewing-machine operating variable.

11. In a sewing machine as defined in claim 8, furthermore comprising means (VR1) operative for automatically adjusting the amount by which the integral signal (eo1) changes per pulse integrated in dependence upon operator-performed adjustment of the amount of cloth feed per stitch.

12. In a sewing machine as defined in claim 8, the successive phases of buttonhole formation comprising formation of first and second series of bar-tack stitches and of first and second series of line-tack stitches; furthermore comprising means (VR3) for selecting the number of stitches in the first series of line-tack stitches and means (VR2) for establishing the number of stitches in the second series of line-tack stitches in dependence upon the number of stitches selected for the first series of line-tack stitches but with the inclusion of a corrective factor, whereby selection of the number of stitches for the first series of line-tack stitches results in a different number of stitches for the second series of line-tack stitches such that the total lengths of both series of line-tack stitches are equal.

13. In a sewing machine having a machine frame, a main shaft rotatably supported on the machine frame, and stitch-forming means including a needle bar with a needle and a cloth feeder operatively connected to the main shaft, in combination therewith, a novel buttonholding system capable when activated of automatically producing all the stitches of a complete buttonhole without operator intervention during the course of buttonhole formation, the buttonholing system comprising
an addressable static memory storing stitch-pattern data pertaining to successive phases of button-hole formation;
pulse-generating means generating pulses in synchronism with rotation of the main shaft;
counter means operative for counting the pulses to form an ongoing count whose value indicates how far the buttonholing operation has proceeded;
user-activated selecting means for selecting counts which are to indicate the starts and ends of successive phases of buttonhole formation and for thereby selecting the length of the buttonhole to be produced;
and process-dividing means operative for recognizing the selected counts and thereby ascertaining the moments at which the successive phases of buttonhole formation are to be initiated and terminated and at such moments automatically selecting for read-out from the static memory different respective stored stitch-pattern data.

14. A buttonhole stitch control system for a sewing machine as claimed in claim 1, wherein the means electrically memorizing the size of a buttonhole employed includes a variable resistor (VR3), and a wiper (M) which is positionally set by the size of a button employed to vary the voltage (−Eb) at which the wiper contacts the variable resistor, thereby to determine the number of line-tack stitches of the buttonhole.

15. A buttonhole stitch control system for a sewing machine as claimed in claim 2, wherein the control means (2) includes solenoids (Tr1, Tr2, Tr3), and cams operatively connected to the stitch forming instrumentality and made effective by the solenoids for controlling the buttonhole stitches.

16. A buttonhole stitch control system for a sewing machine as claimed in claim 2, wherein the control means (2) includes a static memory storing signals for controlling the buttonhole stitches made by the stitch forming instrumentality.

* * * * *